United States Patent [19]

Hall et al.

[11] Patent Number: 5,774,415
[45] Date of Patent: Jun. 30, 1998

[54] GEOPHONE NORMALIZATION PROCESS

[75] Inventors: Ernest M. Hall, Houston; James Willers, Missouri City, both of Tex.

[73] Assignee: Geo Space Corporation, Houston, Tex.

[21] Appl. No.: 761,456

[22] Filed: Dec. 6, 1996

[51] Int. Cl.$^6$ .................................................. G01V 13/00
[52] U.S. Cl. .............................................. 367/13; 73/1.85
[58] Field of Search ................................ 367/13; 73/1.85

[56] References Cited

U.S. PATENT DOCUMENTS

| | | | |
|---|---|---|---|
| 3,930,216 | 12/1975 | Hall, Jr. ...................................... | 367/13 |
| 4,003,018 | 1/1977 | McCormick ............................... | 367/13 |
| 4,043,175 | 8/1977 | Fredriksson et al. ...................... | 73/1.85 |
| 4,296,483 | 10/1981 | Haill .......................................... | 367/13 |
| 4,448,057 | 5/1984 | Craig ............................................. | 73/1 |

*Primary Examiner*—Ian J. Lobo
*Attorney, Agent, or Firm*—Fulbright & Jaworski LLP

[57] ABSTRACT

A method is described for controlling the magnetic field strength of an electromagnetic geophone by: a) providing a specified center value each for a geophone sensitivity parameter and a geophone damping parameter; b) magnetizing an electromagnetic geophone to full saturation of the magnet; c) measuring the value each for the fully saturated geophone sensitivity parameter and damping parameter; d) partially demagnetizing the geophone; e) measuring the value each for the partially demagnetized geophone sensitivity and damping parameters; f) calculating a slope for a geophone demagnetization line representing geophone demagnetization versus demagnetizing force by utilizing the measured fully saturated geophone sensitivity and damping parameters as one point on the line and utilizing the measured partially demagnetized geophone sensitivity parameter and damping parameter as another point on the line; and g) calculating an amount of demagnetization required to provide the geophone with sensitivity and damping parameters each with the same percentage deviation in absolute value from their respective specified center values.

7 Claims, 9 Drawing Sheets

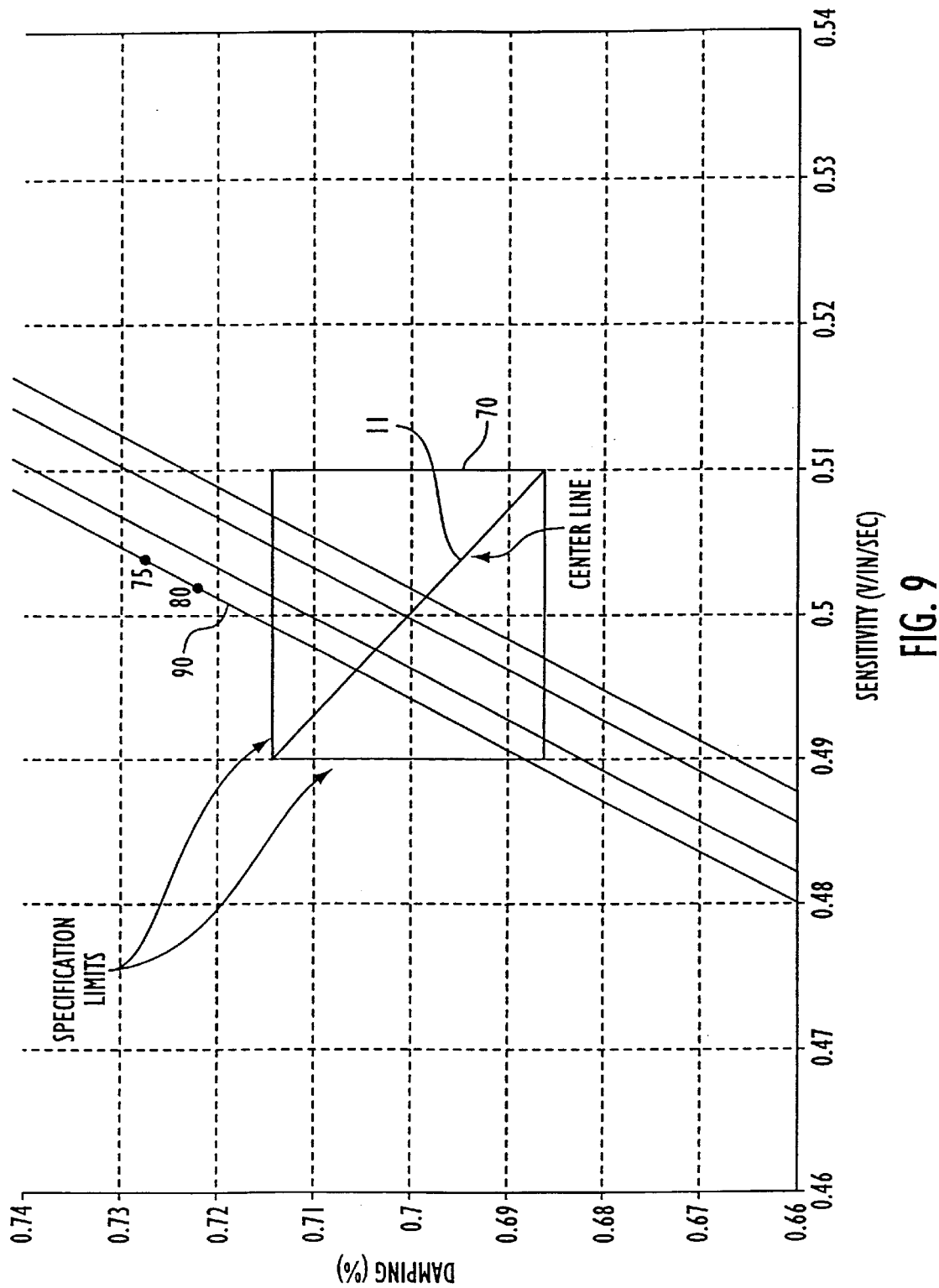

GEOPHONE NORMALIZATION PROCESS

SPECIFICATION

BACKGROUND OF THE INVENTION

1. Field of the Invention.

This invention relates to a controlled method of simultaneously calibrating geophone sensitivity and damping parameters to obtain the minimum standard deviation for these parameters from the specified optimum value for each.

2. Brief Description of the Related Technology.

Presently, geophones are calibrated by several methods to achieve a geophone having optimum sensitivity and damping parameter values. In one method, geophones are calibrated such that they undergo a controlled demagnetization to control the impulse response of each geophone to obtain geophones having matched impulse responses for sensitivity. See U.S. Pat. No. 3,930,216 entitled, "Method of Making Geophones Having Matched Sensitivities," by Hall, Jr., co-inventor of the present invention.

Typically, six parameters are used to describe a geophone's performance, which are: (1) natural frequency; (2) coil resistance; (3) sensitivity; (4) damping; (5) distortion; and (6) coil centering. Referring to FIG. 1, the sensitivity of a geophone 10 is directly proportional to the strength of the magnetic field of the geophone permanent magnet 50, where the geophone inertial mass, consisting of a coil assembly 56, is suspended within the magnetic field by springs 64 on each end of coil assembly 56.

Among geophones in a production lot, it is important to obtain uniform sensitivity and damping. This requires that the magnetic field strength of the magnets of the geophones in the production lot have as little variation as, possible from one geophone to another. One method of accomplishing this goal is to fully magnetize the geophone magnet, then demagnetize it to a specified and controlled level for sensitivity. However, the demagnetization process also affects the damping of the geophone, since it is not possible to set the geophone sensitivity at a prescribed level by demagnetization without also affecting geophone damping. Conversely, it is not possible to set the geophone damping at a prescribed level by demagnetization without also affecting geophone sensitivity.

When using these prior art methods, a controlled demagnetization calibration is accomplished. However, the most commonly used method relies upon controlling the demagnetization such that a specified center value of geophone sensitivity is obtained. When using this method, the geophone damping is uncontrolled, but normally falls within a specified tolerance range of +/-5% from the desired center value. The second method used relies upon controlling the demagnetization such that a specified center value of geophone damping is obtained. When using this method, the geophone sensitivity is uncontrolled, but normally falls within a specified range of +/-5% from the desired center value. It is desirable, however, to achieve and maintain as much uniformity as possible between geophones with regard to simultaneously controlling both sensitivity and damping, rather than controlling the demagnetization to achieve either the center value for sensitivity only, or for damping only.

Another method fully magnetizes the geophone magnet 50 of each geophone 10 and relies upon magnet uniformity as provided by the magnet manufacturer to achieve uniform sensitivity and damping. Tolerances among magnet manufacturers and among magnet production lots from any manufacturer vary. Thus, all of the above three methods have obvious drawbacks.

The increasing demand for more accurate geophones, (i.e., geophones having controlled sensitivity and damping parameters within two percent (+/-2%) from the specified center value for each parameter), has created a need for a geophone calibration method that does not calibrate to one of these two parameters at its specified center value at the expense of the other parameter. Demagnetizing the geophone magnet 50 for a specified center value for only one parameter is insufficient to achieve uniform and extremely close tolerance geophones.

The present method provides a method of calibrating geophones using controlled demagnetization, such that both sensitivity and damping parameters for a given geophone fall within two percent (+/-2%) from their respective specified, or center line, values.

SUMMARY OF THE INVENTION

The present invention is for a method of simultaneously calibrating both the sensitivity and damping parameters for a geophone to achieve parameter values for each that are optimal. Preferably, this results in both sensitivity and damping being simultaneously calibrated to within 2% from their respective specified center values. This result is achieved by first fully magnetizing the geophone magnet, measuring the sensitivity and damping parameters of the geophone and then demagnetizing the geophone magnet, using a novel process, until both sensitivity and damping parameters are at a minimum standard deviation from their respective specified center line values.

Unlike prior art methods, which measure impulse response or impulse sensitivity of a geophone, such as the method described above in U.S. Pat. No. 3,930,216, the present method utilizes an impulse in two directions (geophone coil pulled up and then released, and geophone coil pushed down and then released) to calculate the sensitivity, damping and frequency of the geophone, using known methods.

BRIEF DESCRIPTION OF THE DRAWINGS

FIG. 9 graphically illustrates typical geophone demagnetizing curves; and

DETAILED DESCRIPTION OF THE PREFERRED EMBODIMENT

The components and function of a conventional electromagnetic geophone are described in U.S. Pat. No. 3,930,216, mentioned above, and incorporated herein for all purposes.

Figure 1:
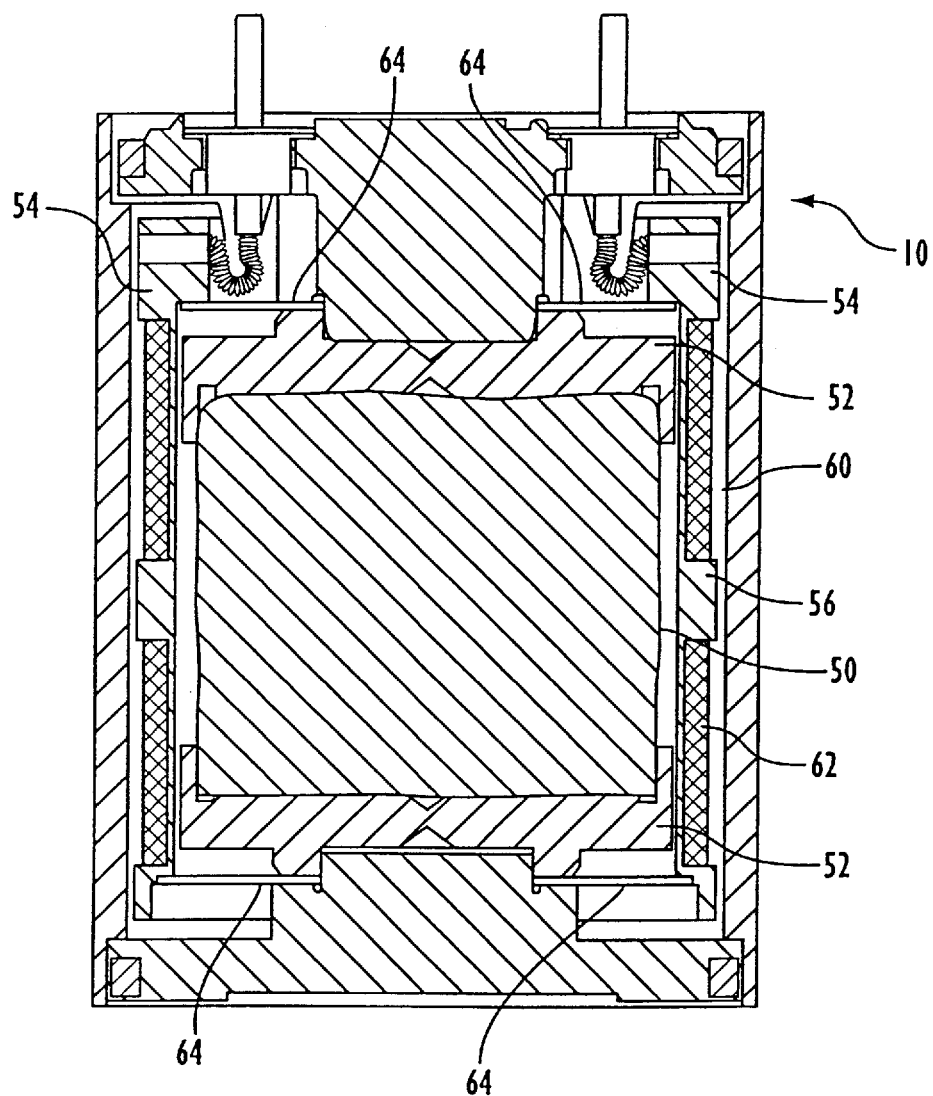
FIG. 1 is a cross-section of an electromagnetic geophone having a magnetic circuit that is standard in the geophone industry.

In reference to FIG. 1, in general operation, a sprung mass-coil assembly 56 of an individual electromagnetic geophone 10 is suspended within an annular air gap 60 in a magnetic field produced by a permanent magnet 50 within the coil assembly 56 and magnet pole pieces 52. Motion of the geophone coil assembly 56 through the magnetic field induces an electrical signal in the coil winding 62 of the coil assembly 56. Coil form 54 supports coil winding 62. The electrical signal induced represents data useful in seismic exploration. It is important that the geophone 10 be calibrated so both its damping and sensitivity parameters fall within a very narrow tolerance range from a specified center value, preferably within +/−2%, so precise seismic data may be obtained.

Figure 2:
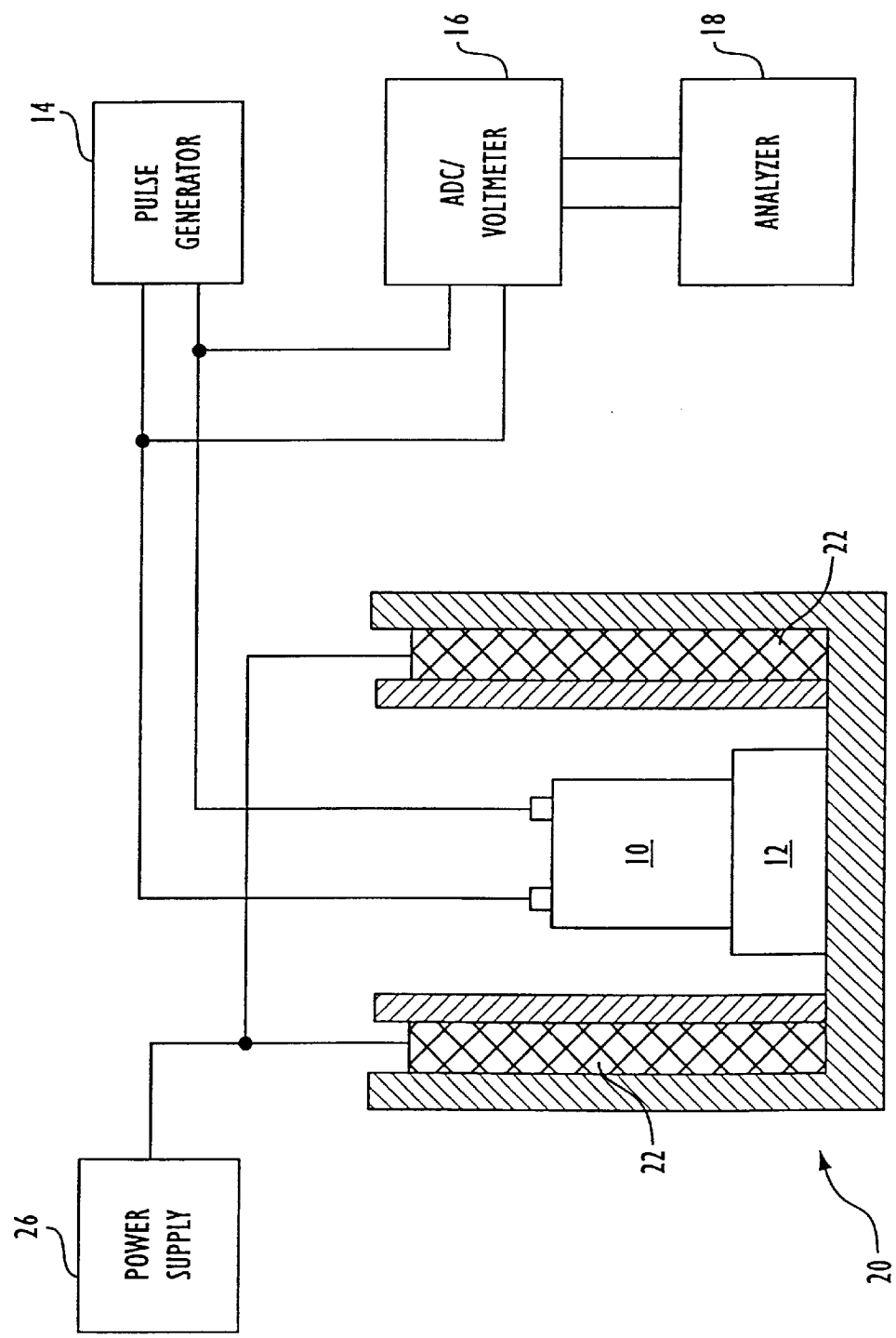
FIG. 2 is a block diagram of a calibration setup for the present invention.

Referring to FIG. 2, to calibrate a geophone 10, the geophone 10 is initially fulling magnetized by saturating permanent magnet 50 (FIG. 1) by placing geophone 10 on a test platform 12. The magnetizing/demagnetizing coil 22 on either side of platform 12 is then fully energized by a DC current applied to coil 22 by DC power supply 26; which causes current to flow in one direction through coil 22. With the flowing current, coil 22 creates a sufficiently strong magnetic field to fully saturate the permanent magnet 50 (FIG. 1) in geophone 10.. A DC current (lift current) is then applied to geophone 10, as a pulse, from a pulse generator 14 through the coil 62 of the geophone coil assembly 56, which causes the geophone coil assembly 56 to raise vertically a short distance. At the conclusion of the pulse, the DC lift current is removed from the geophone coil 62, which causes the geophone coil assembly 56 to fall and then oscillate at a frequency and period of oscillation unique to each geophone 10.

Figure 3:
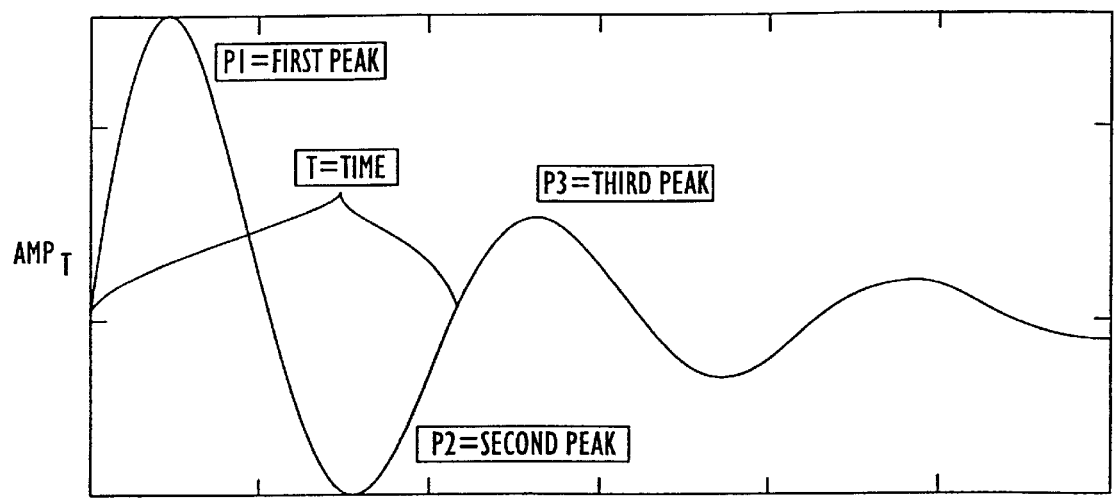
FIG. 3 is a graph of a typical transient response for a geophone being calibrated by the present invention.

The analog waveform (transient response) generated by the oscillating geophone coil assembly 56 is illustrated by example in FIG. 3, and is recorded by an analog to digital converter/voltmeter (ADC) 16, such as the HP3458A manufactured by Hewlett Packard. The analog waveform output by geophone 10 is converted into digital information by the ADC 16. The digital information is then stored in digital memory in a non-volatile media such as a PC hard drive, a magnetic storage disc, or magnetic tape.

A DC current (depression current) opposite in polarity to the lift current, is then applied to geophone 10, as a pulse, by pulse generator 14 through the geophone coil 62 (FIG. 1), which causes the geophone coil assembly 56 to move downward a short distance. At the conclusion of the pulse, the DC depression current is removed from the geophone coil 62, which causes the geophone coil assembly 56 to raise and then oscillate at a frequency and period of oscillation unique to each geophone 10.

The analog waveform (transient response) generated by the oscillating geophone coil assembly 56 is again converted into digital information by ADC 16 and is stored in a non-volatile storage medium (not shown).

A computer controlled analyzer 18, which is typically a software program operating in a personal computer (PC), calculates for each geophone 10, using known formulae based on the relationship of the velocity of the geophone coil assembly relative to the magnetic assembly, among other values: (1) the natural frequency of the geophone sprung mass-coil assembly; (2) the DC geophone coil resistance; (3) the sensitivity; and (4) the damping factor. These calculations are made, using the following equations.

$$\beta := \frac{\ln\left(\frac{A1}{A2}\right)}{\sqrt{\pi^2 + \ln\left(\frac{A1}{A2}\right)^2}}$$

$$Fn := \frac{1}{T \cdot \sqrt{1-\beta^2}}$$

$$A1 := |P1| + |P2|$$

$$A2 := |P2| + |P3|$$

$$G := \sqrt{\frac{A1 \cdot m \cdot \omega}{I} \cdot \exp\left[\frac{a\tan\left(\frac{\sqrt{1-\beta^2}}{\beta}\right)}{\left(\frac{\sqrt{1-\beta^2}}{\beta}\right)}\right]}$$

FIG. 3 illustrates a typical plot of voltage amplitude (A) versus time (T) for a freely oscillating geophone coil, where: m=moving mass (grams); $\beta$ = geophone damping, Fn = natural frequency; and G = sensitivity.

Figure 4:
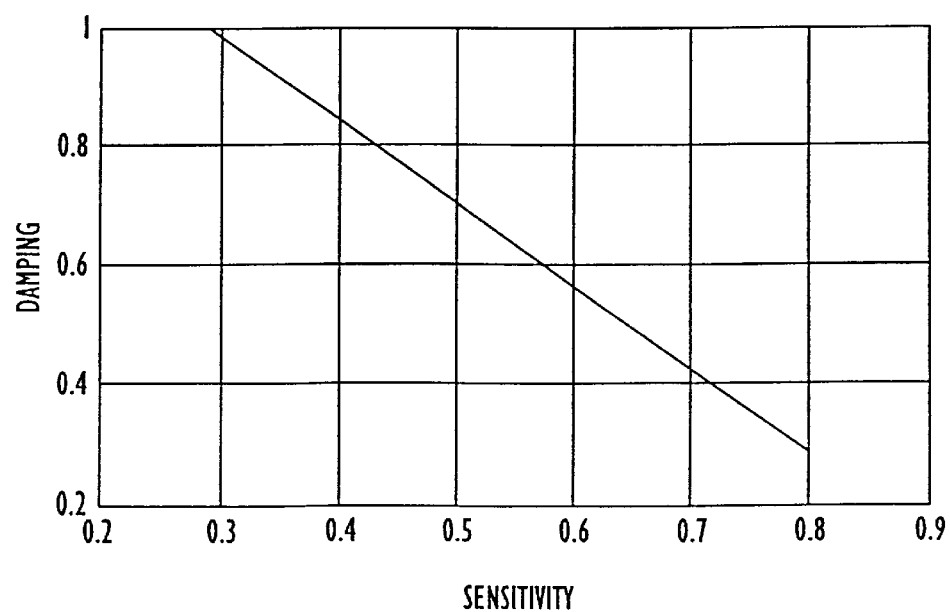
FIG. 4 is a graph of a typical specification line for a geophone being calibrated by the present invention.
Figure 5:
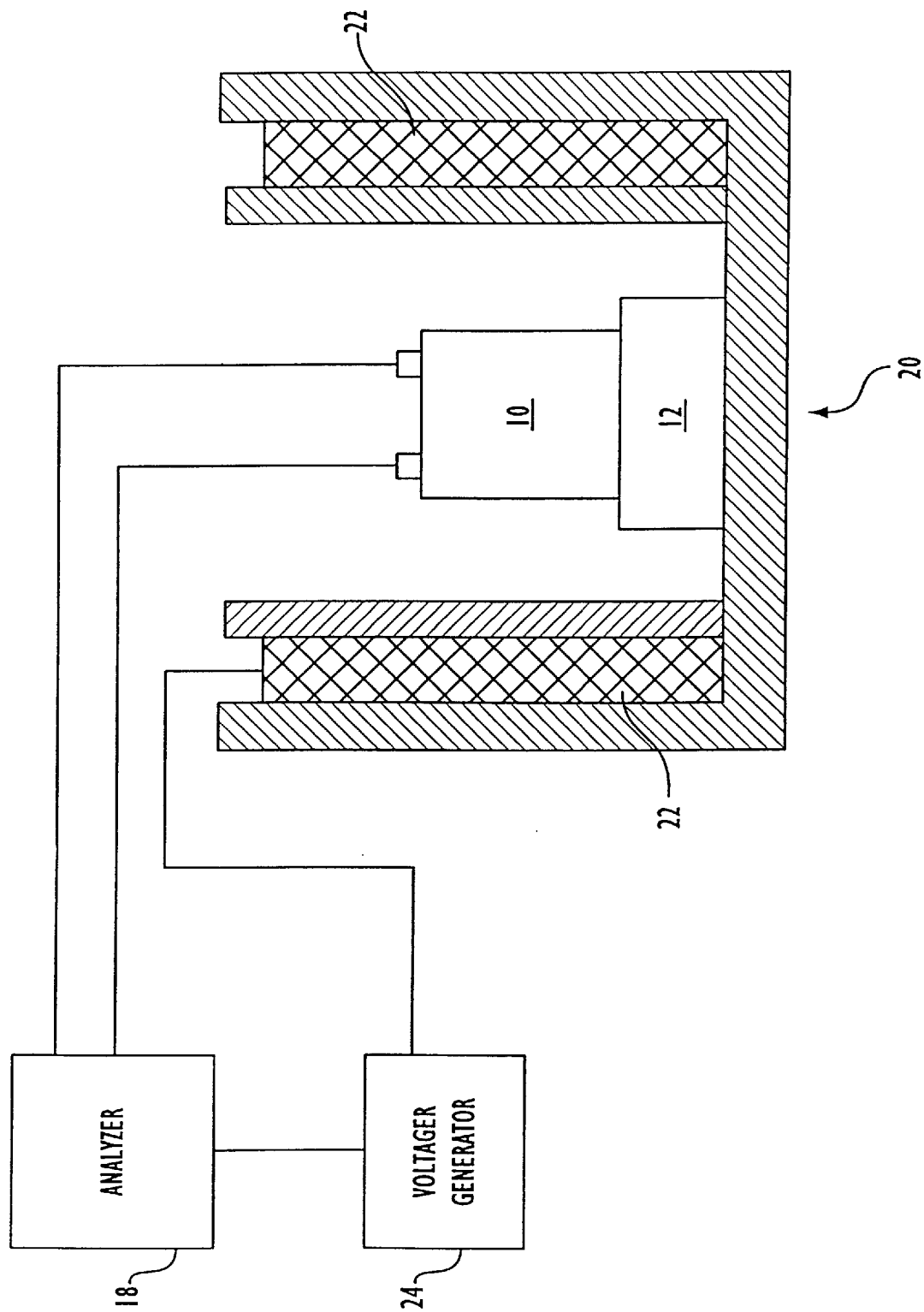
FIG. 5 is a block diagram of a demagnetization setup for the present invention.

Referring to FIG. 5, analyzer 18 uses an algorithm which accesses a database to determine, for any geophone model or type, the demagnetization voltage to be applied to coil 22 to achieve the minimal standard deviation for both sensitivity and damping parameters from their respective specified center line, or optimal, value. A typical specification line showing damping vs. sensitivity is shown in FIG. 4.

Referring to FIG. 5, test platform 12 is disposed within fixture 20 and each individual geophone 10 on test platform 12 is partially demagnetized by application of a demagnetization voltage (AC current) from voltage generator 24 controlled by analyzer 18, preferably embodied as a decaying sinusoidal wave which flows through the magnetization/demagnetization coil 22 disposed within fixture 20. This initial AC voltage level quickly decays to zero, leaving magnet 50 in a stable, partially demagnetized state. In one embodiment, the initial AC sinusoidal wave is created by discharging a bank of capacitors (not shown) charged to a preselected DC voltage level through the inductance of coil 22. This results in a damped sinusoid oscillation between the inductance of coil 22 and the capacitance of the charged capacitors. Analyzer 18 controls the level to which the bank of capacitors is charged.

Figure 6:
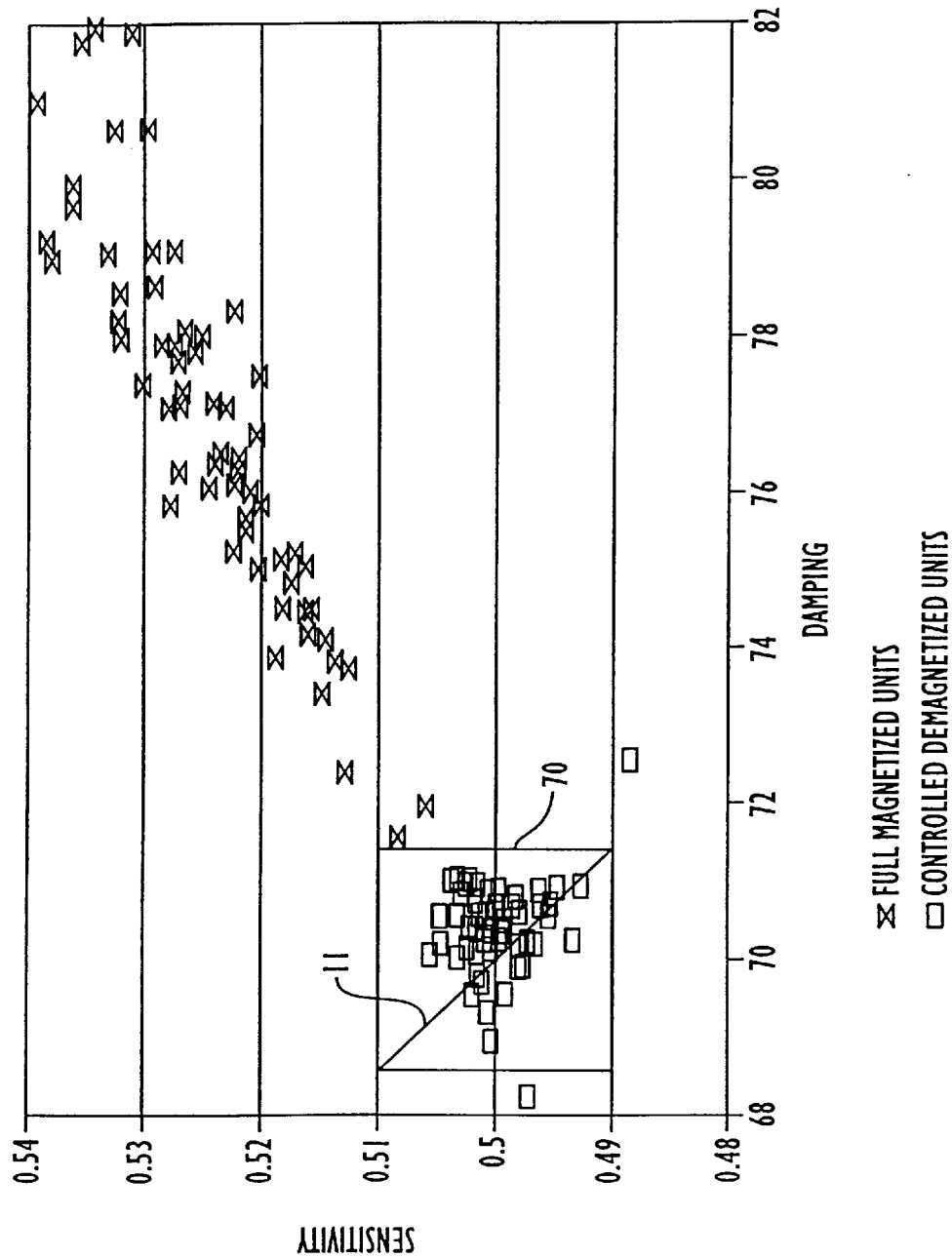
FIG. 6 graphically illustrates a plot of sensitivity vs. damping for geophones calibrated by the present invention.

Referring to FIG. 6, the sensitivity and damping levels of fully magnetized geophones are illustrated. It is not desired to attempt to reach the optimal parameter values for sensitivity and damping of geophone 10, shown by minimum deviation line 11 in FIG. 6, on the first demagnetization, since an attempt to achieve optimum demagnetization in one step may result in an overshoot of the desired parameter values for sensitivity and damping due to non-uniformity among magnets and among geophone coils, and sensitivity and damping transient responses. The amplitude of the demagnetization waveform from voltage generator 24 of FIG. 5 is such that the greater the waveform amplitude, the lower the geophone sensitivity and damping values that are achieved. On the first iteration, analyzer 18 preferably determines a demagnetization voltage to be applied by voltage generator 24 to the coil 22 such that the sensitivity of the geophone 10 is reduced about 1–5% and overshoot is avoided.

After the first demagnetization waveform is applied to coil 22, ADC 16 measures the new geophone sensitivity and damping parameter values. The difference between the new parameter values and the desired parameter values is calculated by analyzer 18. Analyzer 18 uses a data base, which is an accumulation of data points for demagnetization voltage vs. sensitivity, and demagnetization voltage vs. damping, collected from a representative sample of geophones for each model and type.

For each particular geophone 10 being controlled, a measurement of sensitivity and damping is made at full magnetic saturation of the magnet 50. A measurement of sensitivity and damping is also made at less than full saturation, e.g. 1%–5% partial demagnetization. These two measurements establish the relationship between the level of the demagnetizing voltage and the demagnetization curve of the particular geophone 10 being controlled. Analyzer 18 in turn uses this data to determine the level of demagnetization required to move the measured values of sensitivity and damping along the demagnetization curve until such curve intersects minimum deviation line 11 (FIGS. 6 and 9).

Figure 7:
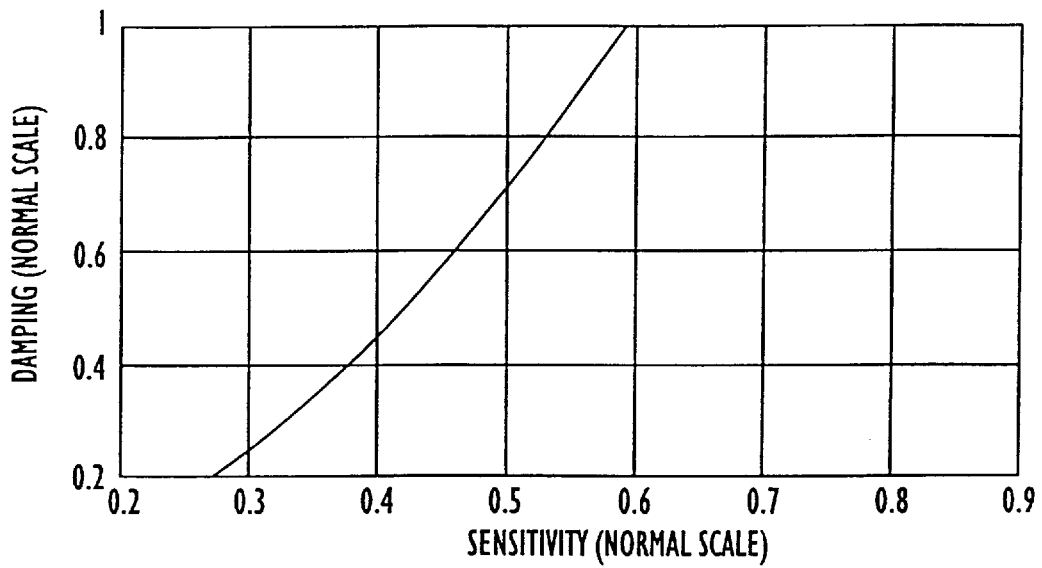
FIGS. 7 and 8 are graphs of a geophone demagnetization curve, in normal scale and log scale, respectively, for a geophone being calibrated.
Figure 8:
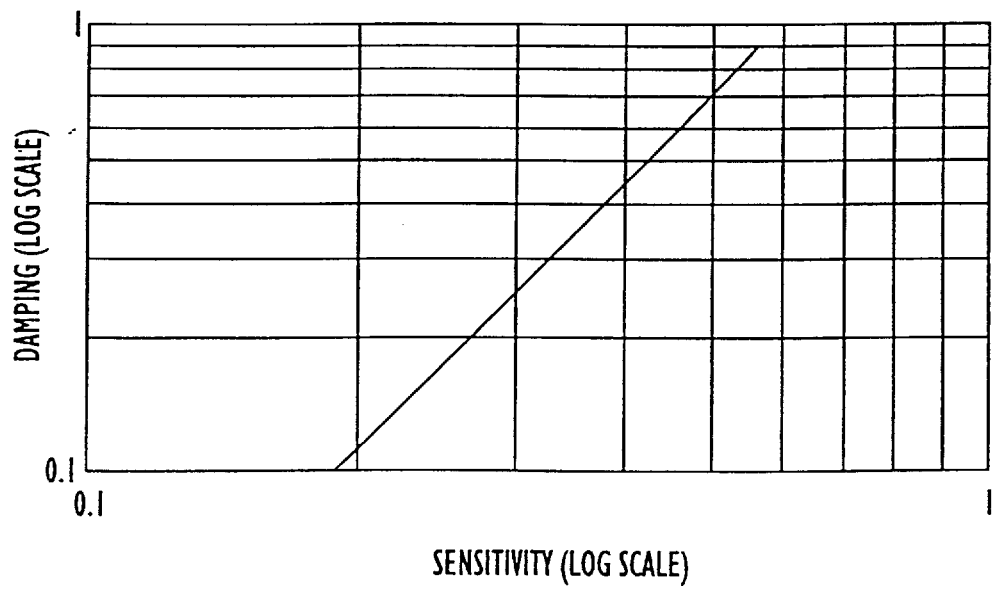

Analyzer 18 is also used to determine values for sensitivity and damping which cause these two parameters to be equidistant (measured in percentage) from specified center values. The equidistant (i.e., minimum deviation) values for sensitivity and damping are shown as minimum deviation line 11, which represents the desired controlled values for sensitivity and damping. Preferably, minimum deviation is not achieved, when considering both sensitivity and damping, until the percentage deviation is equal for both sensitivity and damping, and in opposite directions around minimum deviation line 11. A straddle will always be present when minimum deviation for both sensitivity and damping is achieved. To make the minimum deviation calculation, analyzer 18 utilizes data representing, respectively, the slope of the specification line (FIG. 4) and the geophone demagnetization curve (FIGS. 7–9).

The intercept of the specification line and the demagnetization curve is calculated using a quadratic equation, as follows:

$$(ax^2 + b \cdot x + c) = 0 \qquad \text{General quadratic equation}$$

solve for $x$:

$$\frac{-b - \sqrt{b^2 - 4 \cdot a \cdot c}}{2a} = x \qquad \text{Quadratic formula}$$

The quadratic equation is to be solved such that the controlled values for sensitivity and damping are equidistant (i.e., minimum deviation) from specified center values. In such a case, equation (1), as shown below, is used. The values for "a," "b," and "c" in the quadratic formula are replaced with the values shown below.

$$a = g_s \cdot b_i \quad b = b_s \cdot g_i^2 \quad c = -2 \cdot g_i^2 \cdot g_s \cdot b_s$$

$$(g_s \cdot b_i \cdot g_p^2 + b_s \cdot g_i^2 \cdot g_p - 2 \cdot g_i^2 \cdot g_s \cdot b_s) = 0 \qquad \text{General quadratic equation}$$

$g_s$ = specification center value for sensitivity $b_s$ = specification center value for damping $$g_p = \frac{-b_s \cdot g_i^2 + \sqrt{b_s^2 \cdot g_i^4 - 4 \cdot g_s \cdot b_i(-2 \cdot g_i^2 \cdot g_s \cdot b_s)}}{2 \cdot g_s \cdot b_i} \qquad \text{Quadratic formula}$$

$g_p$ = the predicted sensitivity value $$b_p = -b_s \cdot \frac{g_p - 2 \cdot g_s}{g_s} \qquad (1)$$

$b_p$ = the predicted damping value $$p_g = \frac{g_p - g_s}{g_s} \quad p_b = \frac{b_p - b_s}{b_s}$$

$p_g$,$p_b$ = the percentage the predicted value is from the specified center value $b_p = 0.70308$ $g_p = 0.49780$ $p_g = -0.004403$ $p_b = 0.004403$ The percentage the values for sensitivity and damping deviate from the specified center values are equal but opposite, and thus, minimum deviation from specified center values.

The method of this invention can also be used to control the demagnetization of geophones with different specification tolerances for damping and sensitivity. For example, assume the damping tolerance is twice the sensitivity tolerance. The solution to the quadratic equation is as follows:

$$a = g_s \cdot b_i \cdot g_t \quad b = b_s \cdot g_i^2 \cdot b_t \quad c = -2 \cdot g_i^2 \cdot g_s \cdot b_s \left( \frac{b_t + g_t}{2} \right)$$

$$\left[ g_s \cdot b_i \cdot g_t \cdot g_p^2 + b_s \cdot g_i^2 + b_t \cdot g_p - 2 \cdot g_i^2 \cdot g_s \cdot b_s \cdot \left( \frac{b_t + g_t}{2} \right) \right] = 0 \qquad \text{General quadratic equation}$$

$g_b$ = the predicted sensitivity value $$g_p = \frac{-b_s \cdot g_i^2 \cdot b_t + \sqrt{b_s^2 \cdot g_i^4 \cdot b_t^2 - 4 \cdot g_s \cdot b_i \cdot g_t \left[ -2 \cdot g_i^2 \cdot g_s \cdot b_s \left( \frac{b_t + g_t}{2} \right) \right]}}{2 \cdot g_s \cdot b_i \cdot g_t} \qquad \text{Quadratic formula}$$

$b_p$ = the predicted damping value $$b_p = \frac{b_s(1 + b_t) - b_s(1 - b_t)}{g_s(1 - g_t) - g_s(1 + g_t)} g_p + b_s - \frac{b_s(1 + b_t) - b_s(1 - b_t)}{g_s(1 - g_t) - g_s(1 + g_t)} g_s \qquad (2)$$

-continued $$p_g = \frac{g_p - g_s}{g_s} \quad p_b = \frac{b_p - b_s}{b_s}$$

$p_g$;$p_b$ = the percent the predicted value is from the specified center value.

$b_p$ = 0.70463

$g_p$ = 0.49835

$p_g$ = −0.003307

$p_b$ = 0.006614

The percentage deviation for damping is twice the percentage deviation for sensitivity.

In general, the demagnetization curves shown in FIGS. 7 and 8 illustrate the relationship between sensitivity and damping as a function of magnetic field strength with the sensitivity varying linearly with magnetic field strength, and where the damping varies as the square of the magnetic field strength. The relationship between sensitivity, damping and magnetic field strength defines the shape of the demagnetization curve. The starting point of the demagnetization curve varies from geophone to geophone when magnetized to full magnetic saturation. The data base is used to obtain two points, 75 and 80, on a demagnetization line 90 as shown in FIG. 9.

Referring to FIG. 9, the first point 75 on the demagnetization line 90 is generated from data collected by analyzer 18 when the geophone magnet 50 (FIG. 1) is fully saturated and the geophone coil 62 is thereby at maximum sensitivity. The second point 80 on line 90 is generated from data collected when the geophone magnet 50 has been demagnetized partially (1–5%) and geophone sensitivity has been reduced proportionately. Analyzer 18 then calculates and determines, using the data base, the demagnetization voltage amplitude necessary to be applied by voltage generator 24 to reduce sensitivity and damping parameters for the geophone to their optimal first step levels. As determined by analyzer 18, another demagnetization waveform of a greater amplitude (second step) is then applied by voltage generator 24 to the coil 22. Sensitivity and damping measurements are again taken by ADC 16 and compared by analyzer 18 to the desired parameter values.

These steps are repeated until the desired parameter values for geophone sensitivity and damping is achieved, which is preferably where the standard deviation of each parameter from its respective specified center line "dead on" value is within tolerance (e.g., less than +/−2% deviation), shown as the controlled demagnetized geophone values of FIG. 6, within box 70, or preferably, where the controlled values for sensitivity and damping are equidistant (i.e., minimum deviation) from specified center values, indicated by minimum deviation line 11 in FIG. 6.

Figure 10A:
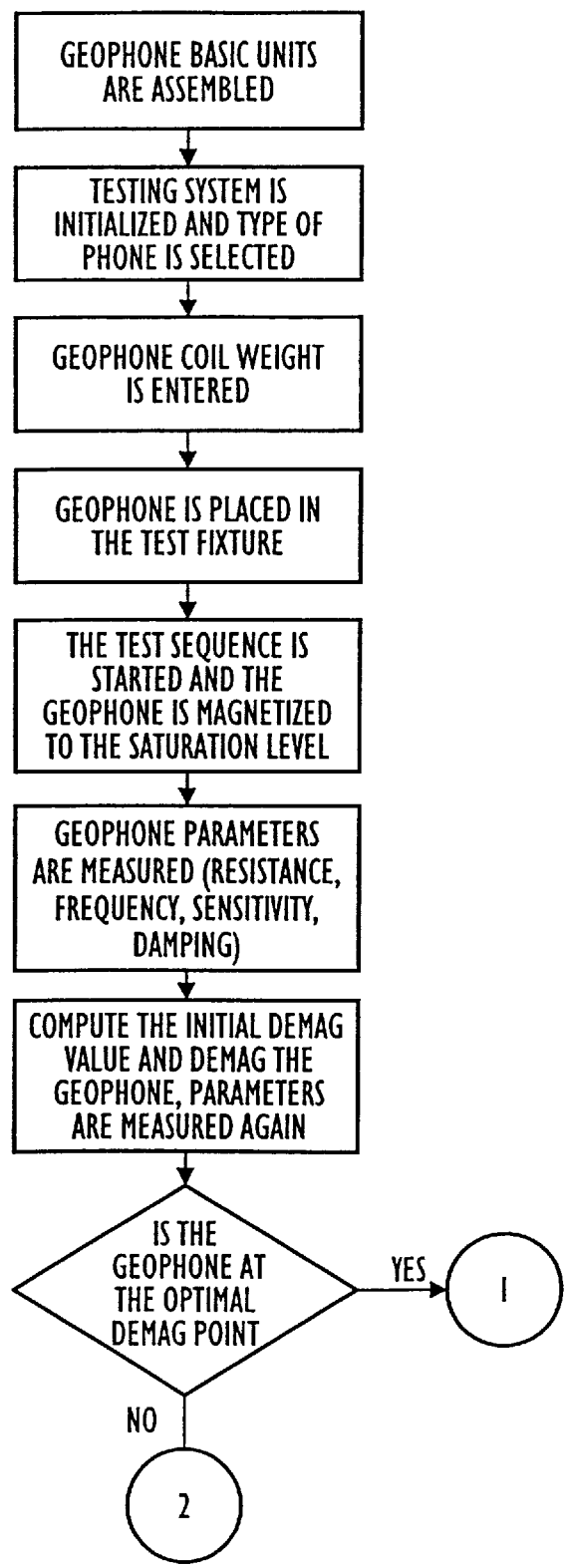
FIGS. 10A and 10B depict a flow chart illustrating a calibration method of the present invention.
Figure 10B:
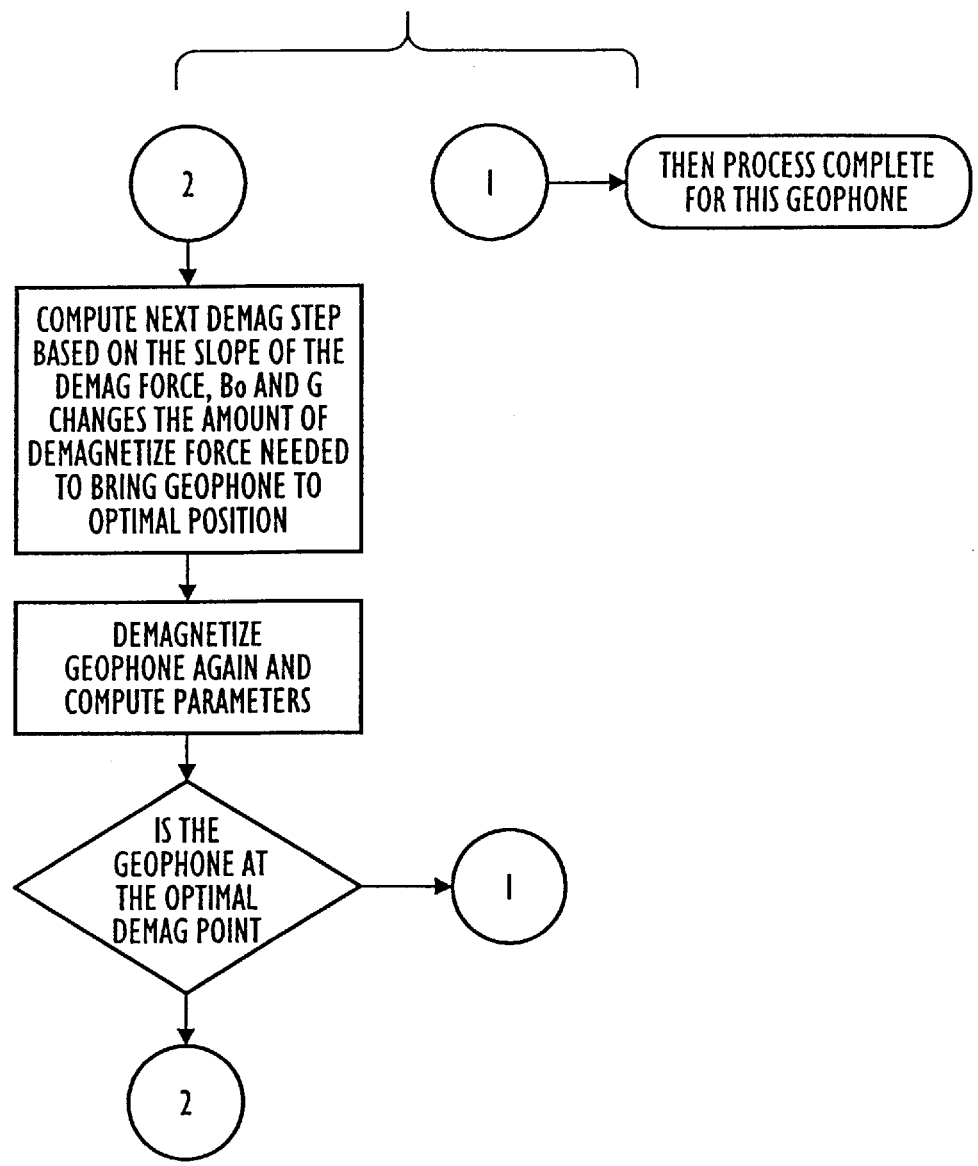

To summarize, this calibration method is an iterative process of: (1) fully magnetizing a geophone magnet; (2) measuring the sensitivity and damping values of the geophone; (3) comparing sensitivity and damping measured values to data base values; (4) partially demagnetizing the geophone magnet to determine the amplitude level of the demagnetization curve for the geophone being calibrated; (5) based on the level of the demagnetization curve, calculating the demagnetizing voltage necessary to achieve the desired minimal standard deviation for both geophone sensitivity and damping values; and (6) successively demagnetizing the geophone until the respective minimum deviation values are achieved. A preferred calibration method is illustrated in FIGS. 10A and 10B.

The foregoing disclosure and description of the invention are illustrative and explanatory of the preferred embodiments, and changes in the components, circuit elements, or connections may be made without departing from the spirit of the invention.

What is claimed is:

1. A method of calibrating a geophone for sensitivity and damping parameters, comprising the steps of:
   a) providing a geophone having a magnet and a coil assembly disposed within said geophone;
   b) providing a magnetization coil in close proximity to said geophone;
   c) providing a respective specified center value each for said geophone sensitivity parameter and said damping parameter;
   d) energizing said magnetization coil so said geophone magnet is magnetized to full saturation;
   e) measuring the values for said sensitivity and damping parameters of said fully magnetized geophone;
   f) partially demagnetizing said geophone magnet;
   g) measuring the values for sensitivity and damping parameters of said partially demagnetized geophone; and
   h) repeating steps f) and g) until said geophone sensitivity and damping parameters each deviate a predefined percentage from said respective specified center parameter values.

2. The method of claim 1, wherein step h) is accomplished such that said percentage deviation of said damping parameter from said respective specified damping value and said percentage deviation of said sensitivity parameter from said respective specified sensitivity value are equal in absolute value but are opposite in sign from one another.

3. The method of claim 1, wherein said magnetization coil is energized using DC current.

4. The method of claim 1, wherein steps f) and g) are repeated until said geophone sensitivity and damping parameters each deviate not more than +/−2 percent from said respective specified center parameter values.

5. A method of controlling the magnetic field strength of an electromagnetic geophone, comprising the steps of:
   a) magnetizing an electromagnetic geophone to full saturation;
   b) providing a respective specified center value each for a geophone sensitivity parameter and for a geophone damping parameter; and c) demagnetizing said geophone until said sensitivity and damping parameters are each within +/−2 percent of their respective specified center values.

6. A method of controlling the magnetic field strength of an electromagnetic geophone, comprising the steps of:

a) providing a respective specified center value each for a geophone sensitivity parameter and for a geophone damping parameter;

b) magnetizing an electromagnetic geophone to full saturation;

c) measuring the value for said fully saturated geophone sensitivity parameter and damping parameter;

d) partially demagnetizing said geophone;

e) measuring the value for said partially demagnetized geophone sensitivity parameter and damping parameter;

f) calculating a plot representing geophone demagnetization versus demagnetization force by utilizing said measured fully saturated geophone sensitivity and damping parameters as one point on said plot and utilizing said measured partially demagnetized geophone sensitivity parameter and damping parameter as another point on said plot;

g) calculating an amount of demagnetization required to provide said geophone with sensitivity and damping parameters each within +/−2 percent deviation from their respective specified center values by utilizing said geophone demagnetization plot; and h) demagnetizing said geophone such that sensitivity and damping parameters are within +/−2 percent from their respective specified center values.

7. The method of claim 6, wherein step h) is accomplished such that said percentage deviation of said damping parameter from said respective specified damping value and said percentage deviation of said sensitivity parameter from said respective specified sensitivity value are equal in absolute value but are opposite in sign from one another.

* * * * *